United States Patent
Long et al.

(10) Patent No.: US 10,867,284 B2
(45) Date of Patent: Dec. 15, 2020

(54) GENERATING RECRUITMENT LEADS BASED ON TARGETED CONTENT

(71) Applicant: Microsoft Technology Licensing, LLC, Redmond, WA (US)

(72) Inventors: Lanhui Long, Sunnyvale, CA (US); Kevin Jia, Santa Clara, CA (US); Kathleen Garvey, Mountain View, CA (US); Raviraj Jain, San Francisco, CA (US); William Tang, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 14/947,963

(22) Filed: Nov. 20, 2015

(65) Prior Publication Data

US 2017/0147983 A1 May 25, 2017

(51) Int. Cl.
*G06Q 10/10* (2012.01)
*H04L 29/08* (2006.01)
*H04L 29/06* (2006.01)

(52) U.S. Cl.
CPC ....... *G06Q 10/1053* (2013.01); *G06Q 10/105* (2013.01); *H04L 67/02* (2013.01);
(Continued)

(58) Field of Classification Search
CPC .. G06Q 50/01; G06Q 10/105; G06Q 10/1053; G06Q 10/063112; H04L 67/30;
(Continued)

(56) References Cited

U.S. PATENT DOCUMENTS

2006/0224729 A1* 10/2006 Rowe ............... G06Q 10/06 709/224
2009/0063468 A1* 3/2009 Berg ............... G06F 17/30864
(Continued)

OTHER PUBLICATIONS

Gardner, Oli. How to Collect More Leads Using Unbounce Landing Pages and Wufoo. wufoo.com. Sep. 24, 2013. [Retrieved on: Oct. 15, 2018]. Retrieved from internet: <URL:https://www.wufoo.com/blog/wufoo-and-unbounce/>. entire document (Year: 2013).*

(Continued)

*Primary Examiner* — Tamara Griffin
(74) *Attorney, Agent, or Firm* — Schwegman Lundberg & Woessner, P.A.

(57) ABSTRACT

A machine may be configured to generate recruitment leads based on targeted content. For example, the machine causes a presentation of an item of digital media in a user interface of a first device associated with a member of a social networking service. The member may be targeted for the presentation of the item of digital media. The machine, based on the presentation of the item to the member, accesses an event message pertaining to an interaction by the member with the item of digital media. The machine, based on the event message, identifies an indication of interest by the member in a content of the item. The machine generates a communication pertaining to the interest by the member in the content of the item. The machine transmits the communication to a second device associated with a recruiter.

20 Claims, 12 Drawing Sheets

(52) U.S. Cl.
CPC .............. *H04L 67/12* (2013.01); *H04L 67/22* (2013.01); *H04L 67/30* (2013.01); *H04L 67/42* (2013.01)

(58) Field of Classification Search
CPC ......... H04L 67/02; H04L 67/12; H04L 67/42; H04L 67/22
USPC ........................................ 705/319, 320, 321
See application file for complete search history.

(56) References Cited

U.S. PATENT DOCUMENTS

| | | | | |
|---|---|---|---|---|
| 2013/0046683 A1* | 2/2013 | Onder | ................ | G06Q 30/0244 705/39 |
| 2013/0046704 A1* | 2/2013 | Patwa | .................... | G06Q 10/06 705/321 |
| 2013/0325734 A1* | 12/2013 | Bixler | ................ | G06Q 10/1053 705/321 |
| 2015/0025977 A1* | 1/2015 | Doyle | .................... | G06Q 50/01 705/14.66 |
| 2015/0032462 A1* | 1/2015 | Dardick | ............. | G06Q 10/1053 705/2 |
| 2015/0071427 A1* | 3/2015 | Kelley | ............... | G06Q 30/0202 379/265.09 |
| 2015/0170103 A1* | 6/2015 | Garg | .................. | G06Q 10/1053 705/321 |

OTHER PUBLICATIONS

Thelandingpagecourse. Welcome to The Smart Marketer's Landing Page Conversion Course. waybackmachine. Sep. 25, 2014. [Retrieved on: Oct. 15, 2018]. Retrieved from internet: <URL:https://web.archive.org/web/20140925200339/https://thelandingpagecourse.com/landing-page-101-intro/>. entire document (Year: 2014).*

* cited by examiner

GENERATING RECRUITMENT LEADS BASED ON TARGETED CONTENT

TECHNICAL FIELD

The present application relates generally to the processing of data, and, in various example embodiments, to systems, methods, and computer program products for generating recruitment leads based on targeted content.

BACKGROUND

Traditionally, in an attempt to fill an open position at a company, the company may employ a recruiter to find suitable candidates for the open position. The recruiter may contact one or more people (e.g., potential hires) to determine whether the one or more people are interested in interviewing for the open position at the company. The success of the company in filling the open position depends largely on the effectiveness of the recruiter. At least one aspect that impacts the overall effectiveness of the recruiter is the recruiter's ability to accurately identify and engage suitable candidates in a timely manner for the job—persons who have the skills required for the job, have an interest in the job, and have the desire to interview for the job.

Job candidates may be identified in a number of ways, to include job postings, trade shows, direct marketing, advertising, Internet marketing, spam, or recruiter prospecting activities such as cold calling. For example, a recruiter may advertise a job in a job posting on a web site, and may identify job candidates among the applicants for the advertised job. Typically, a recruiter (or recruiter team) will have limited resources to find suitable candidates for open positions. Accordingly, the effectiveness of the recruiter or recruiter team frequently depends upon how intelligently the limited resources are allocated to call on or engage job candidates.

To effectively allocate individual recruiters to call on or engage with job candidates, it is helpful to have some idea of the suitability of the job candidates for the job openings and their interest in applying for the jobs so that recruiters can be allocated to those job candidates who are most likely to fill the open positions. However, determining the suitability and interest in the job of a job candidate is not trivial. In many instances, a particular person identified as a recruitment lead (e.g., a job candidate) may have the required skills for the job opening but may not be interested in the particular position. In other scenarios, the particular person identified as a recruitment lead may be interested in the particular job but may not have the desired skills for the job. These and other issues make it difficult to accurately identify and assess the suitability and interest of potential job candidates for various job openings.

BRIEF DESCRIPTION OF THE DRAWINGS

Some embodiments are illustrated by way of example and not limitation in the figures of the accompanying drawings, in which.

DETAILED DESCRIPTION

Figure 1:
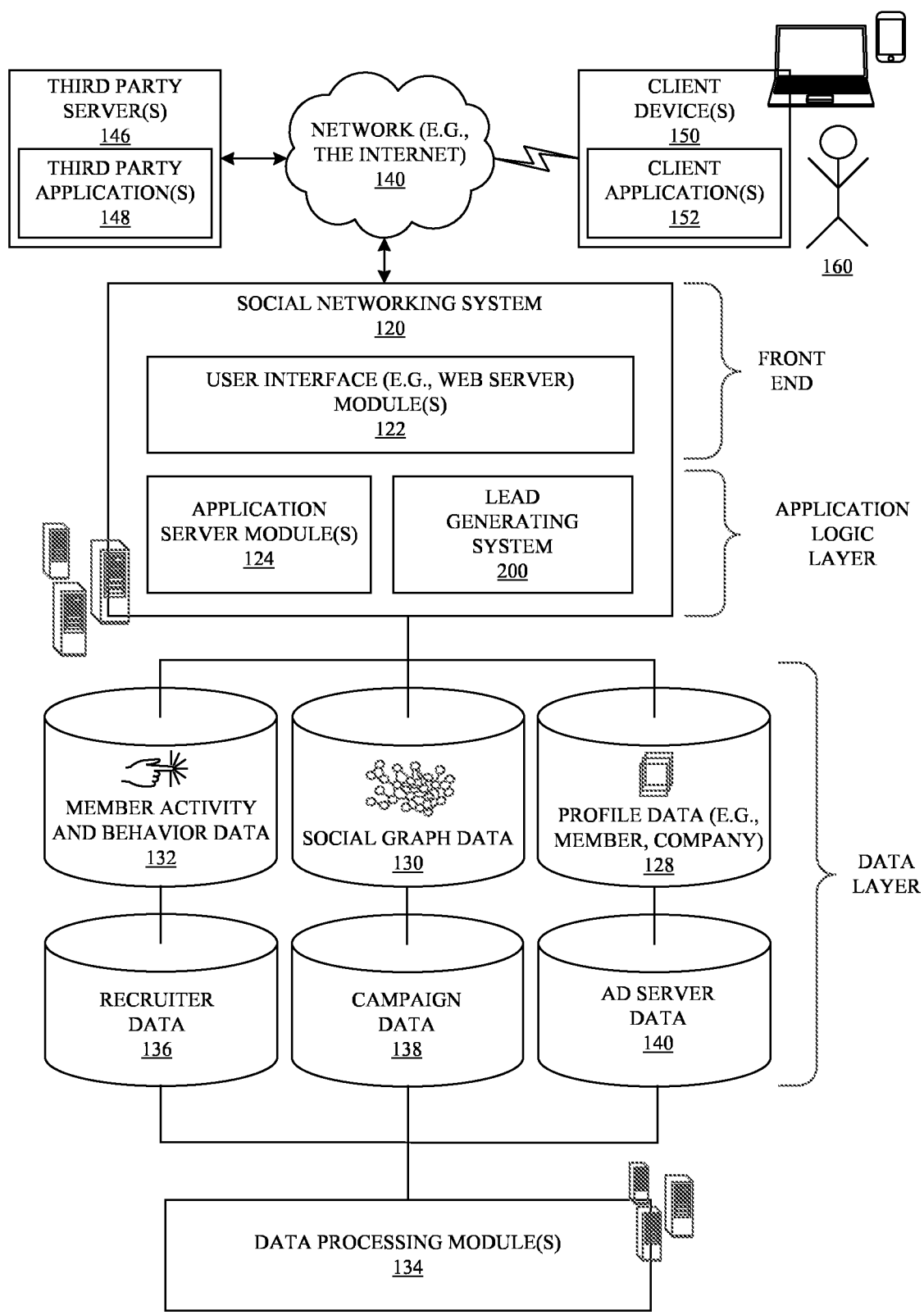
FIG. 1 is a network diagram illustrating a client-server system, according to some example embodiments.

Example methods and systems for generating recruitment leads based on targeted content are described. In the following description, for purposes of explanation, numerous specific details are set forth to provide a thorough understanding of example embodiments. It will be evident to one skilled in the art, however, that the present subject matter may be practiced without these specific details. Furthermore, unless explicitly stated otherwise, components and functions are optional and may be combined or subdivided, and operations may vary in sequence or be combined or subdivided.

Traditionally, to fill an open job position at an organization, a recruiter advertises a job (e.g., in a job posting on a web site) and receives numerous applications for the advertised job from a large number of job applicants, most of whom are not a good fit for the advertised role or the organization. As part of the recruiter's job to fill the advertised job, the recruiter also analyses whether the skills or experience of any of the many applicants is a match for the advertised job, identifies a number of suitable candidates for the advertised job, and contacts the candidates to determine whether they are interested in the advertised job. Often, the recruiter spends numerous hours researching the employment backgrounds of the potential candidates, drafting email messages, and cold calling the potential candidates to identify recruitment leads. A recruitment lead may be a person whose skills and work experience are suitable for a particular job and who is interested in applying for the particular job. Sometimes, a company may have a recruitment campaign dedicated to filling one or more open positions at the company. The effectiveness of the recruitment campaign frequently depends upon how intelligently the limited recruiter resources (e.g., the time of one or more recruiters) are allocated to identify and call on or engage job candidates. Companies and, specifically, recruiters may benefit from a faster and a more precise identification of "warm" recruitment leads, such as job candidates whose skills and experience match the requirements of an open position and who are interested in applying for those open positions.

In some example embodiments, a lead generating system is employed to maximize the efficiency of a recruitment campaign. The lead generating system may scale the job of a recruiter by automatically pre-selecting a set of people who are determined to be suitable for an open position based on certain requirements of the job, facilitating a way for the people in the pre-selected group to expressly manifest an interest in the job, determining that the pre-selected people actually expressly manifested their interest in the job, and communicating which of the pre-selected people expressed an interest in the job to the recruiter. The recruiter or a job advertiser may define the targeting criteria for identifying people to pre-select. Based on receiving the communication indicating which of the pre-selected people expressed an interest in the job, the recruiter may then contact individuals who showed interest in the job to attempt to hire one of them for the job.

In some example embodiments, one or more members of a Social Networking System (also "SNS") receive career-related communications targeted to the one or more members based on various factors (e.g., member profile data, social graph data, member activity or behavior data, etc.). The career-related communications may be associated with (e.g., included in) various types of digital media, such as InMails, Display Ads, Recruitment Ads, Sponsored Updates, news articles, blog entries, videos, images, etc. Based on the interactions by the one or more members with the digital media or the content of the digital media, the interest of the one or more members in the career-related communications may be ascertained and communicated to the recruiter.

In some example embodiments, the lead generating system generates a communication (e.g., message) to be communicated to one or more members of the SNS. The communication may include text, an image, a call-to-action (e.g., a request to a user to do something), or a suitable combination thereof. The content of the communication may pertain to an open position and may describe the particular job and skills required of a suitable candidate.

The lead generating system may identify one or more target members for receiving the communication. The one or more target members may be identified based on one or more targeting criteria (e.g., past employer, years of experience, function, location/geography, skills, etc.). In some instances, the identifying of the target members includes matching the one or more targeting criteria and one or more attributes associated with the target members. The one or more attributes may be stored in a record of a member profile database.

The communication may be presented to a particular member in various ways. In certain example embodiments, the communication is displayed in a landing page that is accessed by the member by clicking on a URL included in an item of digital media that was selected for presentation to the particular member. The item of digital media may be selected for presentation to the particular member based on one or more targeting criteria. In various example embodiments, the communication is included in an InMail sent to the particular members, or is shown to the member in a Display Ad, a Job page that describes the job, a Careers page that describes careers available at the company, etc.

The communication may include a mechanism to register member interest in the content of the communication. For example, an "I am interested" button and a call-to-action to click on the "I am interested" button may be presented to the member in a user interface that displays the communication to facilitate the user manifesting his or her interest in the content of the communication. By selecting (e.g., clicking) the "I am interested" button, the member may express an interest in the content of the communication.

As a result of presenting the communication to the one or more target members, one or more indications of interest may be received in response to the presentation of the communication to the one or more target members. Identifiers of the one or more interested target members may be saved in a record for presentation on a device of a recruiter. The names of the one or more interested target members may be shown in a user interface of the device of the recruiter as recruitment leads.

According to some example embodiments, a landing page application may be implemented to cause the presentation of a career-related communication targeted to one or more members in user interfaces (also "UIs") of devices of the one or more members, and to generate recruitment leads based on actions, by the one or more members, that manifest member interest in the career-related communications. In some example embodiments, a campaign building application may be implemented to generate an advertising campaign that includes content (e.g., ads, messages, news, blog entries, images, photographs, video, etc.) targeted at the one or more members. For example, the campaign building application may generate a campaign that advertises one or more jobs at a particular company. In some instances, in addition to the campaign content, the campaign may include additional content customized to determine the interest of the one or more members in the one or more jobs at the particular company that are advertised by the campaign. The presentation of the additional content to the one or more members may be performed in a particular web page (e.g., a landing page). The landing page may be interactive to facilitate member interaction with the additional content. The one or more members may interact with the additional content to express their interest in the one or more jobs at the company. The data pertaining to interactions by the members with content displayed in a landing page associated with a campaign may be stored in a record in a database. A recruiting application (e.g., an application for presenting recruitment leads to recruiters) may access the data pertaining to member interactions with the content of the landing page stored in the database, and may present a communication to a recruiter pertaining to the members who expressed an interest in the content of the landing page (e.g., a customized letter describing a job).

In some example embodiments, the campaign building application may generate the campaign based on various types of data associated with a campaign (e.g., a duration of the campaign, a creative that includes campaign content, target criteria for targeting members, a target group of members, various budget values, etc.). As the campaign content is delivered (e.g., communicated) to one or more members, data pertaining to the delivery of the campaign is stored in a record of the database. For example, as impressions of an ad included in a campaign are delivered to members, a record in the database created (or updated) to track the number of served impressions, delivered revenue associated with the served impressions, remaining budget values, etc. If a member interacted with a particular item of digital media (e.g., clicked a button in a user interface displaying campaign content), a database record of member activity and behavior data may also be created (or updated) to reflect the member interaction.

An example method and system for generating recruitment leads based on targeted content may be implemented in the context of the client-server system illustrated in FIG. 1. As illustrated in FIG. 1, the lead generating system 200 is part of the social networking system 120. As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, application programming interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™, Windows® Phone).

For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, smart watches, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of a social graph. In some example embodiments, a "social graph" is a mechanism used by an online social networking service (e.g., provided by the social networking system 120) for defining and memorializing, in a digital format, relationships between different entities (e.g., people, employers, educational institutions, organizations, groups, etc.). Frequently, a social graph is a digital representation of real-world relationships. Social graphs may be digital representations of online communities to which a user belongs, often including the members of such communities (e.g., a family, a group of friends, alums of a university, employees of a company, members of a professional association, etc.). The data for various entities of the social graph may include member profiles, company profiles, educational institution profiles, as well as information concerning various online or offline groups. Of course, with various alternative embodiments, any number of other entities may be included in the social graph, and as such, various other databases may be used to store data corresponding to other entities.

Consistent with some embodiments, when a person initially registers to become a member of the social networking service, the person is prompted to provide some personal information, such as the person's name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases. As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

In some example embodiments, members may receive advertising targeted to them based on various factors (e.g., member profile data, social graph data, member activity or behavior data, etc.). According to certain example embodiments, one or more members may receive career-related communications targeted to the one or more members based on various factors (e.g., member profile data, social graph data, member activity or behavior data, etc.). The advertising or career-related communications may be associated with (e.g., included in) various types of media, such as InMail, Display Ads, Sponsored Updates, etc. Based on the interactions by the one or more members with the media or the content of the media, the interest of the one or more members in the advertising or career-related communications may be ascertained.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services, and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124.

According to some example embodiments, a landing page application may be implemented to cause the presentation of a career-related communication targeted to one or more members in user interfaces (also "UIs") of devices of the one or more members, and to generate recruitment leads based on actions, by the one or more members, that manifest member interest in the career-related communications. In some example embodiments, a campaign building application may be implemented to generate an advertising campaign that includes content (e.g., ads, messages, news, blog entries, images, photographs, video, etc.) targeted at the one or more members. For example, the campaign building application may generate a campaign that advertises one or more jobs at a particular company. In some instances, in addition to the campaign content, the campaign may include additional content customized to determine the interest of the one or more members in the one or more jobs at the particular company that are advertised by the campaign. The presentation of the additional content to the one or more members may be performed in a particular web page (e.g., a landing page). The landing page may be interactive to facilitate member interaction with the additional content. The one or more members may interact with the additional content to express their interest in the one or more jobs at the company. The data pertaining to interactions by the members with content displayed in a landing page associated with a campaign may be stored in a record in a database (e.g., the recruiter database 136, the member activity and behavior database 132, etc.). A recruiting application (e.g., an application for presenting recruitment leads to recruiters) may access the data pertaining to member interactions with the content of a landing page stored in the recruiter database 136 and may present a communication to a recruiter pertaining to the members who expressed an interest in the content of the landing page (e.g., a customized letter describing a job).

In some example embodiments, the campaign building application may generate the campaign based on various types of data associated with a campaign (e.g., a duration of the campaign, a creative that includes campaign content, target criteria for targeting members, a target group of members, various budget values, etc.). The data associated with a campaign may be stored in a record of campaign database 138.

As the campaign content is delivered (e.g., communicated) to one or more members, data pertaining to the delivery of the campaign is stored in a record of ad server database 140. For example, as impressions of an ad included in a campaign are delivered to members, a record in ad server database 140 is created (or updated) to track the number of served impressions, delivered revenue associated with the served impressions, remaining budget values, etc. If a member interacted with a particular item of digital media (e.g., clicked a button in a user interface displaying campaign content), a record of member activity and behavior database 132 may also be created (or updated) to reflect the member interaction.

Other applications and services may be separately embodied in their own application server modules 124. As illustrated in FIG. 1, social networking system 120 may include the lead generating system 200, which is described in more detail below.

Further, as shown in FIG. 1, a data processing module 134 may be used with a variety of applications, services, and features of the social networking system 120. The data processing module 134 may periodically access one or more of the databases 128, 130, 132, 136, 138, or 140, process (e.g., execute batch process jobs to analyze or mine) profile data, social graph data, member activity and behavior data, recruiter data, campaign data, or ad server data, and generate analysis results based on the analysis of the respective data. The data processing module 134 may operate offline. According to some example embodiments, the data processing module 134 operates as part of the social networking system 120. Consistent with other example embodiments, the data processing module 134 operates in a separate system external to the social networking system 120. In some example embodiments, the data processing module 134 may include multiple servers of a large-scale distributed storage and processing framework, such as Hadoop servers, for processing large data sets. The data processing module 134 may process data in real time, according to a schedule, automatically, or on demand.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
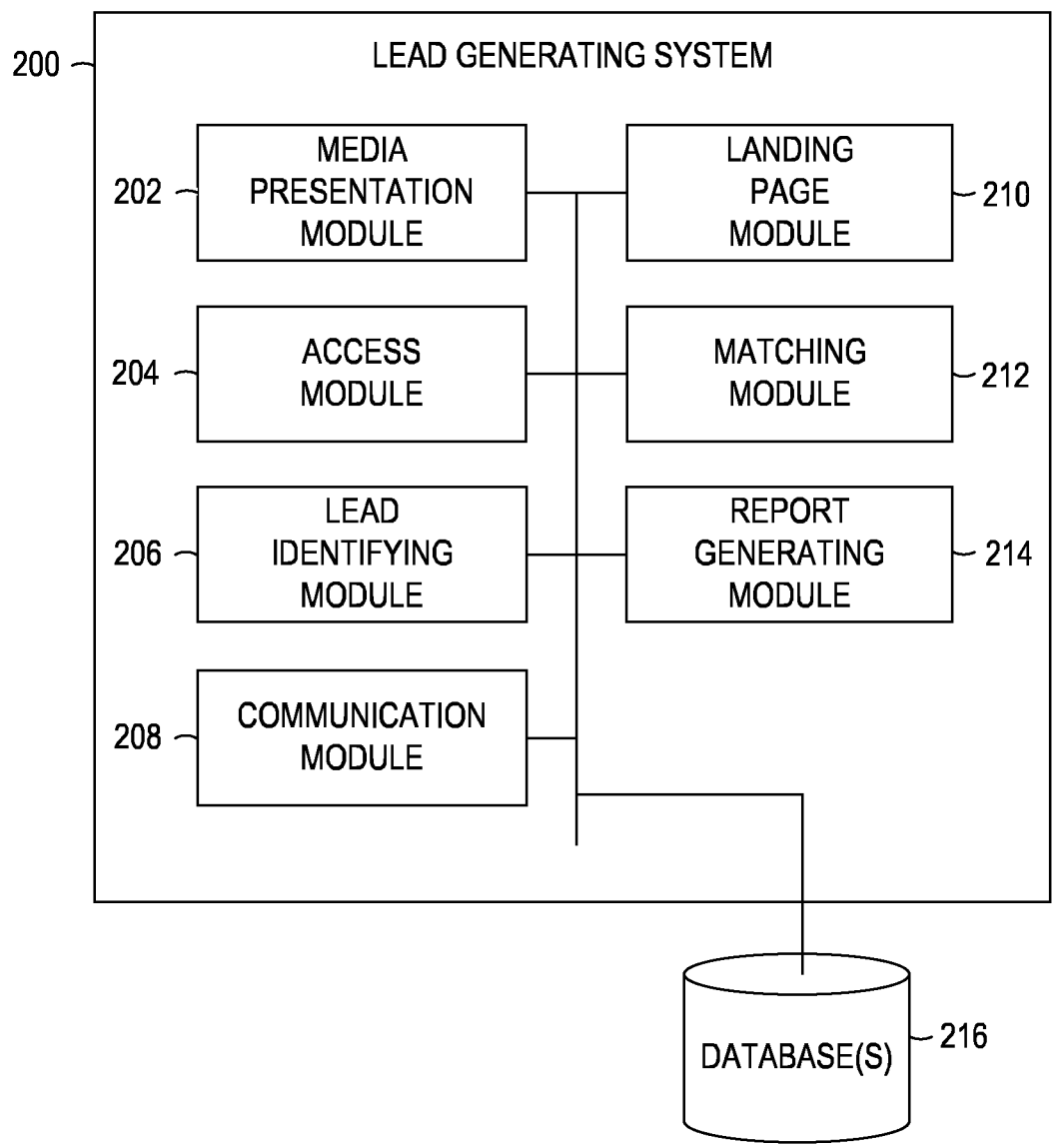
FIG. 2 is a block diagram illustrating components of a lead generating system, according to some example embodiments.

FIG. 2 is a block diagram illustrating components of the lead generating system 200, according to some example embodiments. As shown in FIG. 2, the lead generating system 200 includes a media presentation module 202, an access module 204, a lead identifying module 206, a communication module 208, a landing page module 210, a matching module 212, and a report generating module 214, all configured to communicate with each other (e.g., via a bus, shared memory, or a switch).

According to some example embodiments, the media presentation module 202 causes a presentation of an item of digital media in a user interface of a first device associated with a member of a social networking service (SNS). Examples of items of digital content are an InMail, a Sponsored Update, a Displayed Ad, a news article, a blog entry, an email message, etc. The member may be targeted for the presentation of the item of digital media. In some instances, the member is one of one or more members of the SNS who are targeted for the presentation of the item of digital media. Members of the SNS may be targeted to receive certain items of digital content based on various targeting criteria (e.g., past employer identifier, a number of years of experience, a function, a title, a location or geography, certain member activities, a time, a time range, etc. or a suitable combination thereof). In response to the causing of the presentation of the item of digital media, the member may express (e.g., manifest, show, demonstrate, etc.) interest in the content of the item of digital media through one or more actions in relation to the item of digital media (e.g., respond to a call-to-action, select an element of the user interface, reply to an email message, etc.).

In some example embodiments, the causing of the presentation of the item of digital media includes causing a presentation of a Uniform Resource Locator (URL) that identifies a web page displaying career-related content (e.g., a customized letter that describes a job, why the member is suitable for the job, or both). The web page may also include UI elements (e.g., buttons, windows, etc.) with which the member may interact, for instance, to manifest interest in the content of the item. The identifying of the indication of interest by the member in the content of the item includes identifying an indication of interest by the member in the career-related content. The member may indicate an interest in the career-related content by, for example, selecting an element of the user interface (e.g., clicking a button that states "I am interested."). In certain example embodiments, the causing of the presentation of the item of digital media includes causing a presentation of a URL associated with a landing page that includes a description of a job for which the member is a target candidate.

The access module 204 accesses (e.g., receives) an event message pertaining to an interaction by the member with the item of digital media. The event message may be generated (e.g., by the landing page module 210 described below) as a result of member interacting with the item of digital media. In some example embodiments, the event message includes at least one of an identifier of the item of digital media, a member identifier of the member, and a campaign identifier of a campaign that includes the item of digital media. The accessing may be based on the presentation of the item to the member. For example, the event message may be received in response to the presentation of the item in the user interface of the device associated with the member. The data included in the event message may be stored in database 216 (e.g., recruiter database 136, member activity and behavior database 132, ad server database 140, etc.).

In some example embodiments, the access module 204, based on listening for event messages transmitted (e.g., broadcast) to one or more devices, receives the event message. A communication pertaining to the interest by the member in the content of the item may be generated (e.g., by the communication module 208 described below) based on the event message (e.g., based the data included in the event message or based on receiving the event message). The communication may be transmitted (e.g., by the communication module 208) to a device of a recruiter.

The lead identifying module 206 identifies an indication of interest by the member in a content of the item. The identifying of the interest may be based on the event message (e.g., the data included in the event message) accessed by the access module 204. In some example embodiments, the event message includes at least one of an identifier of the item of digital media, a member identifier of the member, and a campaign identifier of a campaign that includes the item of digital media.

In various example embodiments, the item of digital media describes a company. The indication of interest by the member in the content of the item may be a selection, by the member, of an element of the user interface to indicate an interest to work at the company. In certain example embodiments, the item of digital media describes a job, and the indication of interest by the member in the content of the item is a selection, by the member, of an element of the user interface to indicate an interest to apply for the job. In some example embodiments, the item of digital media describes a particular type of job, and the indication of interest by the member in the content of the item is a selection, by the member, of an element of the user interface to indicate an interest to apply for one or more jobs of the particular type of job.

In some example embodiments, the accessing of the event message pertaining to the interaction by the member with the item of digital media includes receiving a selection, by the member, of an element of the user interface from the first device. The selection may be based on a call-to-action communication included in the item of digital media. The call-to-action communication is, for example, a request to click an "I am interested" button displayed in the user interface. Based on the receiving of the selection, the event message is generated (e.g., by the landing page module 210 described below). The event message may include at least one of an identifier of the item of digital media, a member identifier of the member, and a campaign identifier of a campaign that includes the item of digital media.

The communication module 208 generates a communication pertaining to the interest by the member in the content of the item. The communication module 208 also transmits the communication to a second device associated with a recruiter.

The landing page module 210, in some example embodiments, receives an indication of a selection, by the member, of the URL from the first device. Based on the URL, the landing page module 210 identifies a campaign identifier associated with a campaign that includes the item of digital media. Based on the campaign identifier, the landing page module 210 identifies a creative identifier that identifies a file that includes a landing page content. The landing page content may, for example, include a description of a job. The landing page content may further include an element of the user interface for selection by the member to indicate the interest by the member in the job. Based on the creative identifier, the landing page module 210 accesses the file that includes the landing page content and causes a presentation of the landing page content in the user interface of the first device. If the landing page content includes a description of a job, the identifying of the indication of interest by the member in the content of the item includes identifying an indication of interest by the member in the job (e.g., by selecting or clicking the element of the interface including a call-to-action). The communication transmitted to the second device may identify the member as a lead for the job.

The matching module 212 matches the item of digital media and the member based on a content of the item and a targeting criterion. The targeting criterion may correspond to an attribute that characterizes one or more members and that may be included in the member profiles of the one or more members. Examples of the attribute are a title, a particular skill (e.g., knowledge of Java), seniority level, an employer name (e.g., the name of a previous employer), a geographical location, a number of years of experience, etc. In some example embodiments, the content of the item is tagged with one or more tags that describe the content of the item. The matching of the item and the member may include comparing the one or more tags associated with the item and one or more targeting criteria. For example, the content of the item may be tagged with the following tags: "Senior Engineer," "Java," and "Bay Area." The targeting criteria for matching are "Java" and "Bay Area." The member profile of the member includes "Engineer," "Java," and "Bay Area." Based on determining that the tags associated with the content of the item include "Java," and "Bay Area," and the profile of the member includes "Java," and "Bay Area," the matching module 212 matches the item and the member.

The report generating module 214 generates a report pertaining to a number of members who manifested interest in the content of the item. The report generating module 214 may access a record that stores the data included in one or more event messages pertaining to the interactions by one or more members with the item of digital media, and, based on this data, may determine the number of members who expressed an interest in the content of the item. The communication module 208 may transmit a further communication including the report to the second device associated with a recruiter.

To perform one or more of its functionalities, the lead generating system 200 may communicate with one or more other systems. For example, an integration engine may integrate the lead generating system 200 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a hardware processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 216 (e.g., database 128, 130, 132, 136, 138, or 140).

Figure 3:
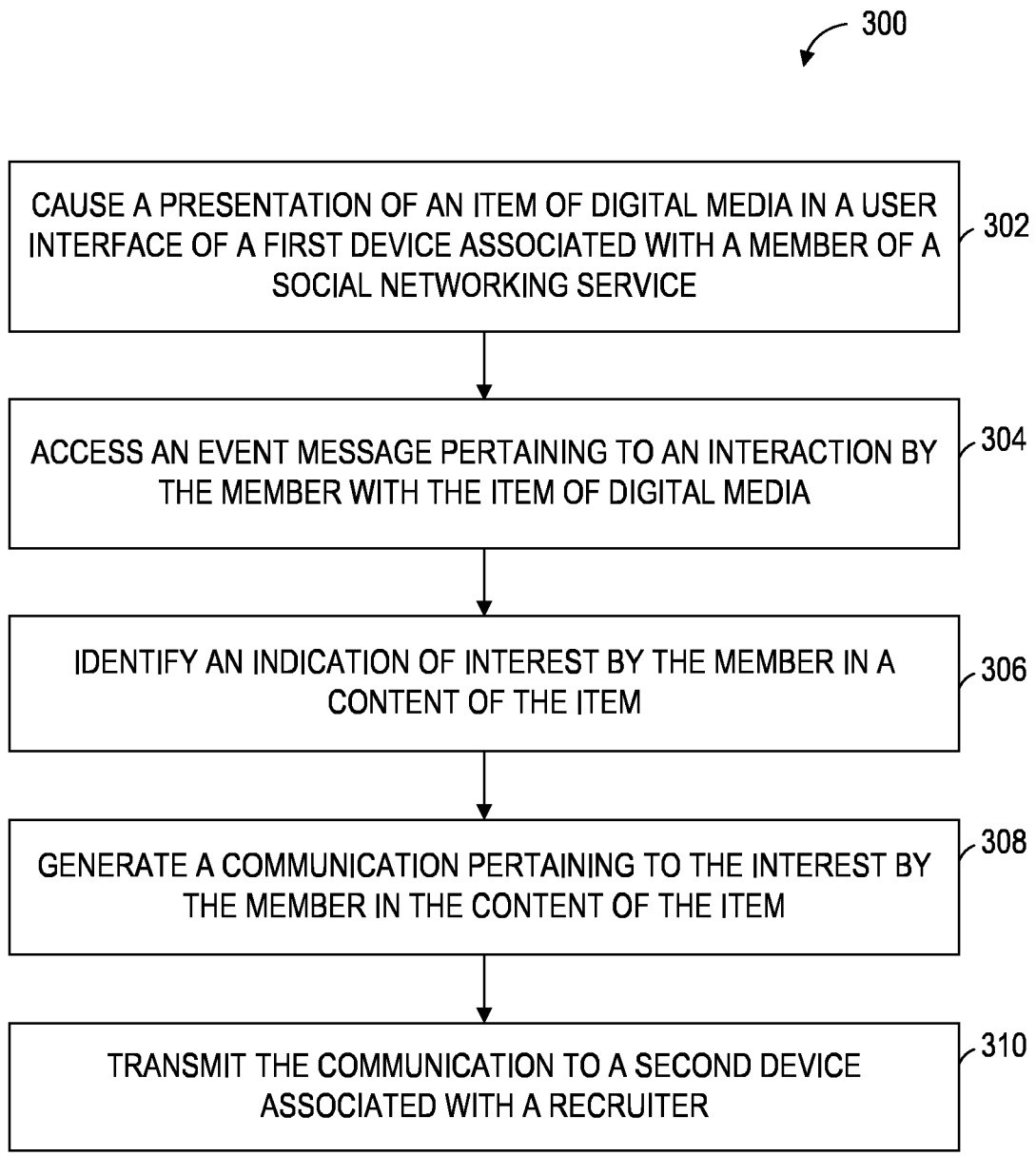
FIG. 3 is a flowchart illustrating a method for generating recruitment leads, according to some example embodiments.

FIGS. 3-9 are flowcharts illustrating a method for generating recruitment leads based on targeted content, according to some example embodiments. The operations of method 300 illustrated in FIG. 3 may be performed using modules described above with respect to FIG. 2. As shown in FIG. 3, method 300 may include one or more of method operations 302, 304, 306, 308, and 310, according to some example embodiments.

At operation 302, the media presentation module 202 causes a presentation of an item of digital media in a user interface of a first device associated with a member of a social networking service. The member may be targeted for the presentation of the item of digital media. In some instances, the member is one of one or more members of the social networking service who are targeted for the presentation of the item of digital media. The media presentation module 202 may access the item of digital media in a database 216 (e.g., campaign database 138) that stores one or more items of digital media.

The member may interact with the item of digital media presented in the user interface of the device associated with the member. For example, the member interacts with the item of digital media by selecting (e.g., clicking) on a button in the user interface to express an interest in the content of the item of digital media. In some example embodiments, the lead generating system 200 receives a selection, by the member, of an element (e.g., a button) of the user interface from the first device. The selection may be based on a call-to-action communication included in the item of digital media. The call-to-action may, for example, be a statement such as "Please click on the button 'I am interested' if you are interested in applying for this job." Based on the receiving of the selection, the lead generating system 200 generates the event message. The event message may include at least one of an identifier of the item of digital media, a member identifier of the member, and a campaign identifier of a campaign that includes the item of digital media.

In some example embodiments, the item of digital media describes a company. The indication of interest by the member in the content of the item may be a selection, by the member, of an element of the user interface to indicate an interest to work at the company.

In various example embodiments, the item of digital media describes a job. The indication of interest by the member in the content of the item may be a selection, by the member, of an element of the user interface to indicate an interest to apply for the job.

In certain example embodiments, the item of digital media describes a particular type of job. The indication of interest by the member in the content of the item may be a selection, by the member, of an element of the user interface to indicate an interest to apply for one or more jobs of the particular type of job.

At operation 304, the access module 204 accesses an event message pertaining to an interaction by the member with the item of digital media. The accessing may be based on (e.g., in response to) the presentation of the item to the member.

At operation 306, the lead identifying module 206 identifies an indication of interest by the member in a content of the item. The identifying may be based on the event message. For example, the lead identifying module 206 may determine, based on the data included in the event message (e.g., an identifier of the item of digital media, a member identifier of the member, a campaign identifier of a campaign that includes the item of digital media, or a suitable combination thereof) that the particular member has expressed an interest in the content of the item.

At operation 308, the communication module 208 generates a communication pertaining to the interest by the member in the content of the item.

At operation 310, the communication module 208 transmits the communication to a second device associated with a recruiter. In some example embodiments, the communication includes a message to be presented in a user interface of the second device associated with the recruiter. Further details with respect to the operations of the method 600 are described below with respect to FIGS. 4-9.

Figure 4:
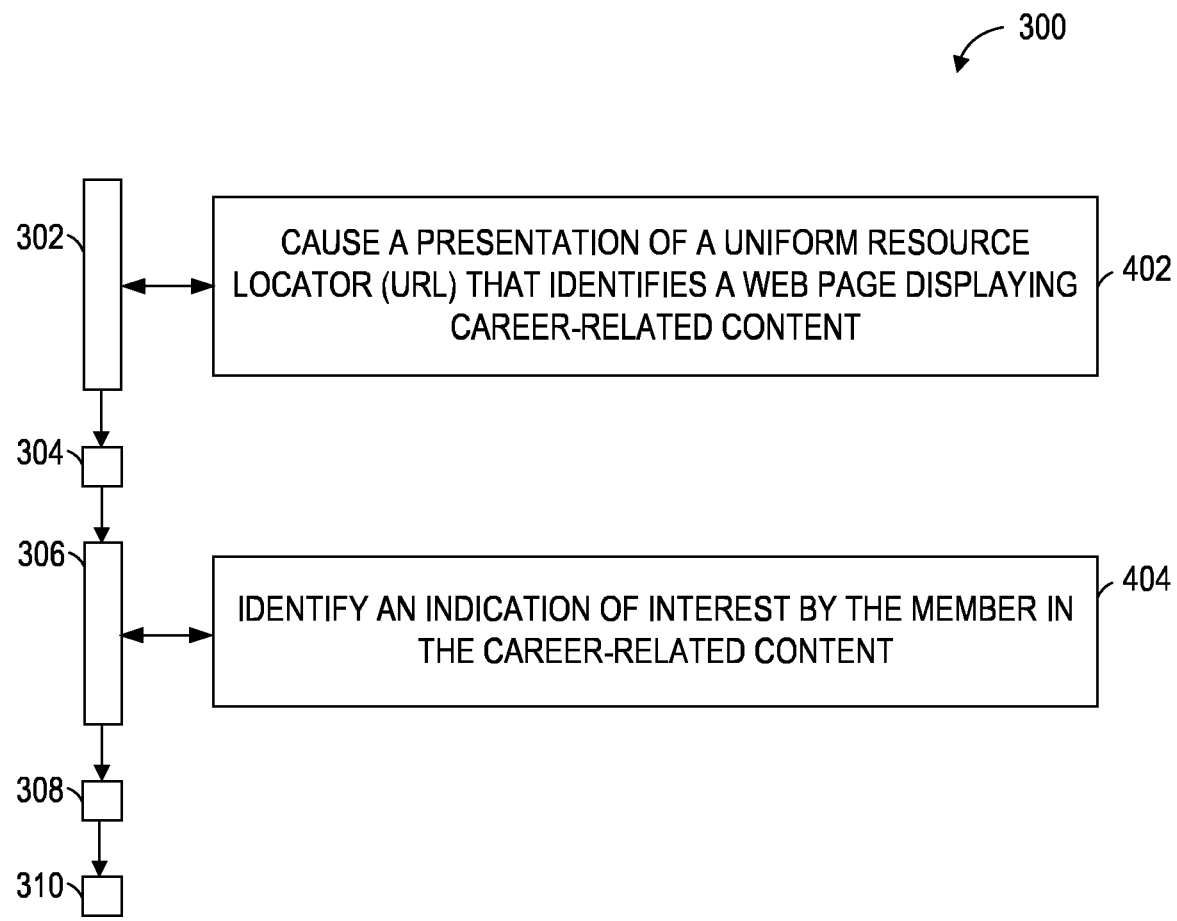
FIG. 4 is a flowchart illustrating a method for generating recruitment leads, and representing steps 302 and 306 of the method illustrated in FIG. 3 in more detail, according to some example embodiments.

As shown in FIG. 4, method 300 may include one or more of operations 402 and 404, according to some example embodiments. Operation 402 may be performed as part (e.g., a precursor task, a subroutine, or a portion) of operation 302, in which the media presentation module 202 causes a presentation of the item of digital media in the user interface of the first device associated with the member of the SNS. At operation 402, the media presentation module 202 causes a presentation of a URL that identifies a web page displaying career-related content. In some example embodiments, the URL is included in the item of digital media. In certain example embodiments, the URL is presented together with the item of digital media.

Operation 404 may be performed as part (e.g., a precursor task, a subroutine, or a portion) of operation 306, in which the lead identifying module 206 identifies an indication of interest by the member in the content of the item. At operation 404, the identifying, by the lead identifying module 206, of the indication of interest by the member in the content of the item (e.g., the career-related content) includes identifying an indication of interest by the member in the career-related content.

Figure 5:
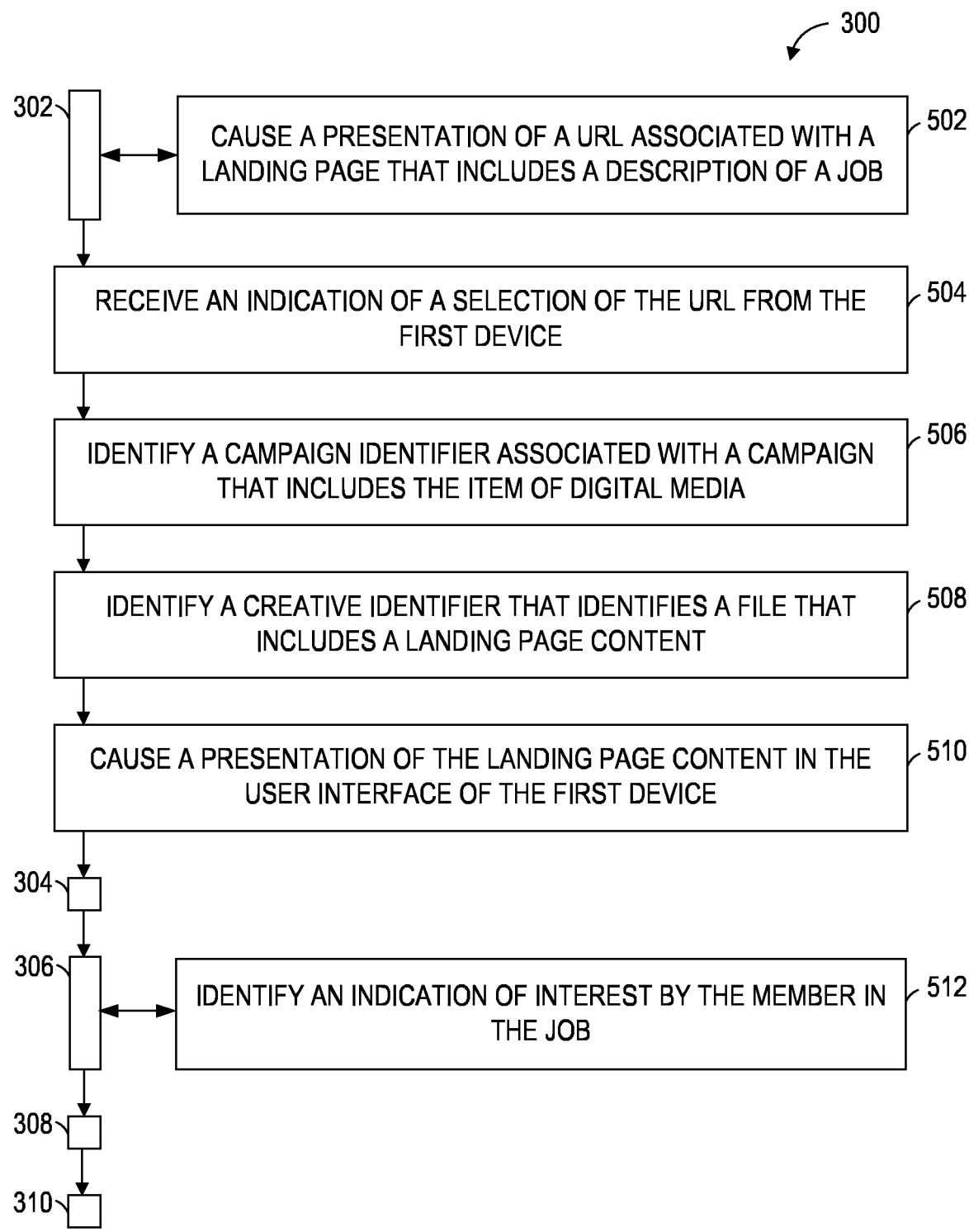
FIG. 5 is a flowchart illustrating a method for generating recruitment leads, and representing steps 302 and 306 of the method illustrated in FIG. 3 in more detail and additional steps of the method illustrated in FIG. 3, according to some example embodiments.

As shown in FIG. 5, method 300 may include one or more of operations 502, 504, 506, 508, 510, and 512, according to some example embodiments. Operation 502 may be performed as part (e.g., a precursor task, a subroutine, or a portion) of method operation 302, in which the media presentation module 202 causes a presentation of the item of digital media in the user interface of the first device associated with the member of the SNS. At operation 502, the media presentation module 202 causes a presentation of a URL associated with a landing page that includes a description of a job for which the member is a target candidate in the user interface of the device.

Operation 504 may be performed after operation 502. At operation 504, the landing page module 210 receives an indication of a selection of (e.g., a clicking on) the URL from the first device. The selection may be made by the member in response to the media presentation module 202 causing the presentation of the URL associated with the landing page that includes a description of a job for which the member is a target candidate in the user interface of the device.

At operation 506, the landing page module 210 identifies a campaign identifier associated with a campaign that includes the item of digital media. The identifying of the campaign may be based on the URL. For example, the URL may include data that may be used by the landing page module 210 to identify the campaign identifier.

At operation 508, the landing page module 210 identifies a creative identifier that identifies a file including a landing page content. The identifying of the creative identifier may be based on the campaign identifier. For example, the campaign identifier may be associated with a creative identifier in a record of database. Based on accessing the record in the database and using the campaign identifier, the landing page module 210 may identify the creative identifier associated with the campaign identifier. In some instances, the campaign identifier may be associated with more than one creative identifiers that each identify a particular file including the content of a particular landing. Based on a rule for selecting a creative identifier (e.g., "select the creative identifier associated with the latest file"), the landing page module 210 may select a particular creative identifier associated with the campaign identifier from a plurality of creative identifiers.

At operation 510, the landing page module 210 causes a presentation of the landing page content in the user interface of the first device. The causing of the presentation of the landing page content may be based on the creative identifier. For example, the content of the landing page includes the content of the file associated with the creative identifier.

Operation 512 may be performed as part of operation 306, in which the lead identifying module 206 identifies an indication of interest by the member in a content of the item. At operation 512, the identifying, by the lead identifying module 206, of the indication of interest by the member in the content of the item includes identifying an indication of interest by the member in the job.

In some example embodiments, the landing page content further includes an element of the user interface for selection by the member to indicate the interest by the member in the job. The element of the user interface may be a button that the member may click.

In certain example embodiments, the communication transmitted to the second device identifies the member as a lead for the job.

Figure 6:
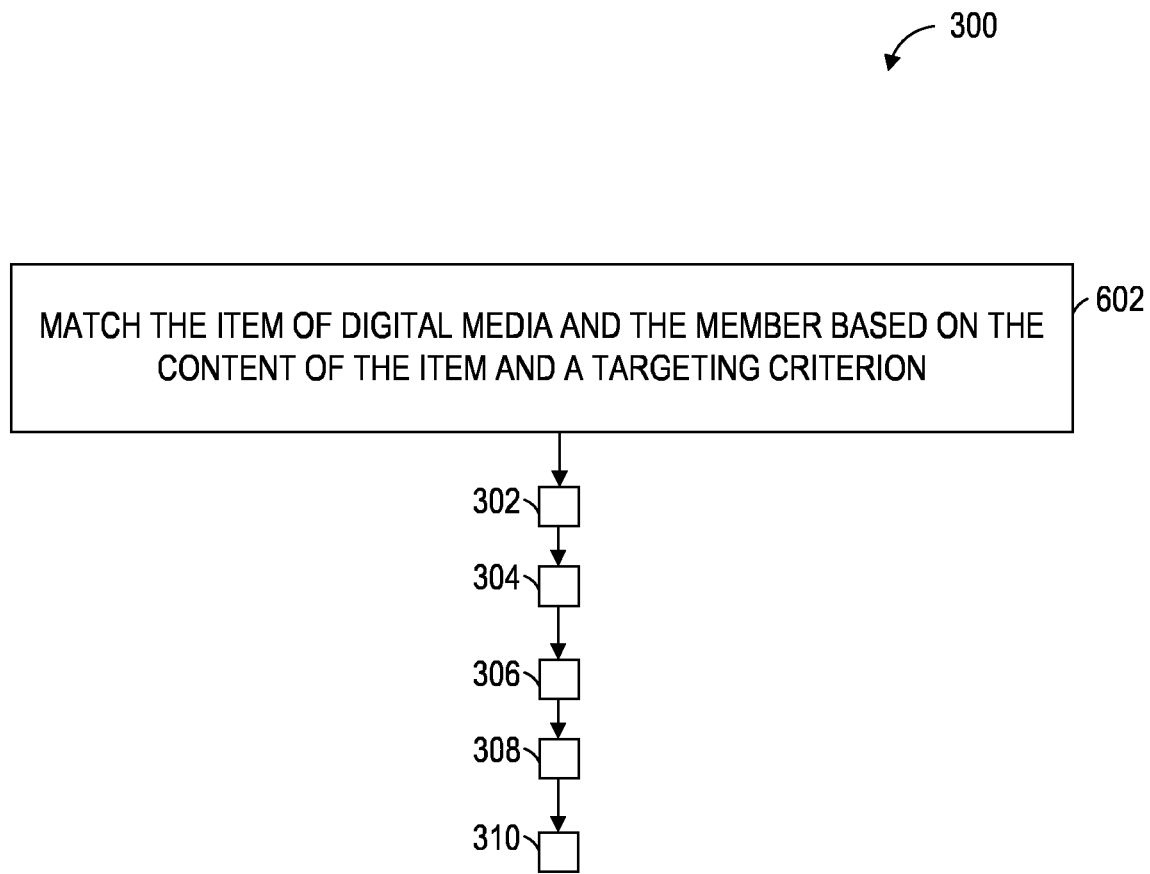
FIG. 6 is a flowchart illustrating a method for generating recruitment leads, and representing an additional step of the method illustrated in FIG. 3, according to some example embodiments.

As shown in FIG. 6, method 300 may include operation 602, according to some example embodiments. Operation 602 may be performed before operation 302, in which the media presentation module 202 causes a presentation of the item of digital media in the user interface of the first device associated with the member of the SNS. At operation 602, the matching module 212 matches the item of digital media and the member based on the content of the item and a targeting criterion. The matching process may be performed to determine whether the item of digital media should be presented to the member. In some instances, the item of digital media should be presented to the member if the item of digital media is generated to target members who have particular attributes (e.g., skills, experience, title, geography, employer, etc.). The particular attributes of a member may be described in the member profile of the member.

Figure 7:
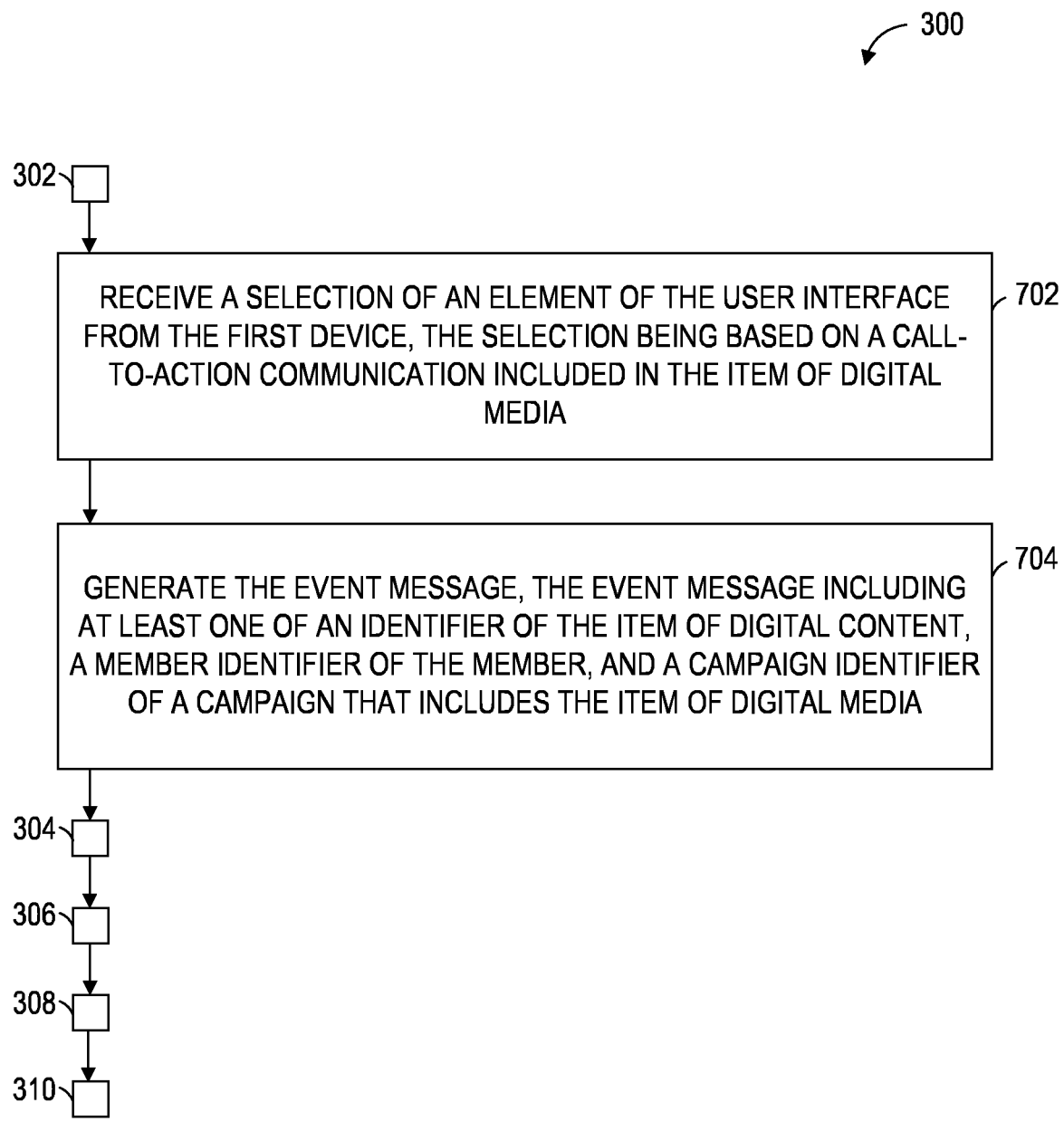
FIG. 7 is a flowchart illustrating a method for generating recruitment leads, and representing additional steps of the method illustrated in FIG. 3 in more detail, according to some example embodiments.

As shown in FIG. 7, method 300 may include one or more of operations 702 and 704, according to some example embodiments. Operation 702 may be performed after operation 302, in which the media presentation module 202 causes a presentation of the item of digital media in the user interface of the first device associated with the member of the SNS.

At operation 702, the landing page module 210 receives a selection, by the member, of an element of the user interface from the first device. The selection may be based on a call-to-action communication included in the item of digital media.

At operation 704, the landing page module 210 generates the event message. The generating of the event message may be based on the receiving of the selection, by the member, of the element of the user interface from the first device. The event message may include at least one of an identifier of the item of digital media, a member identifier of the member, and a campaign identifier of a campaign that includes the item of digital media.

Figure 8:
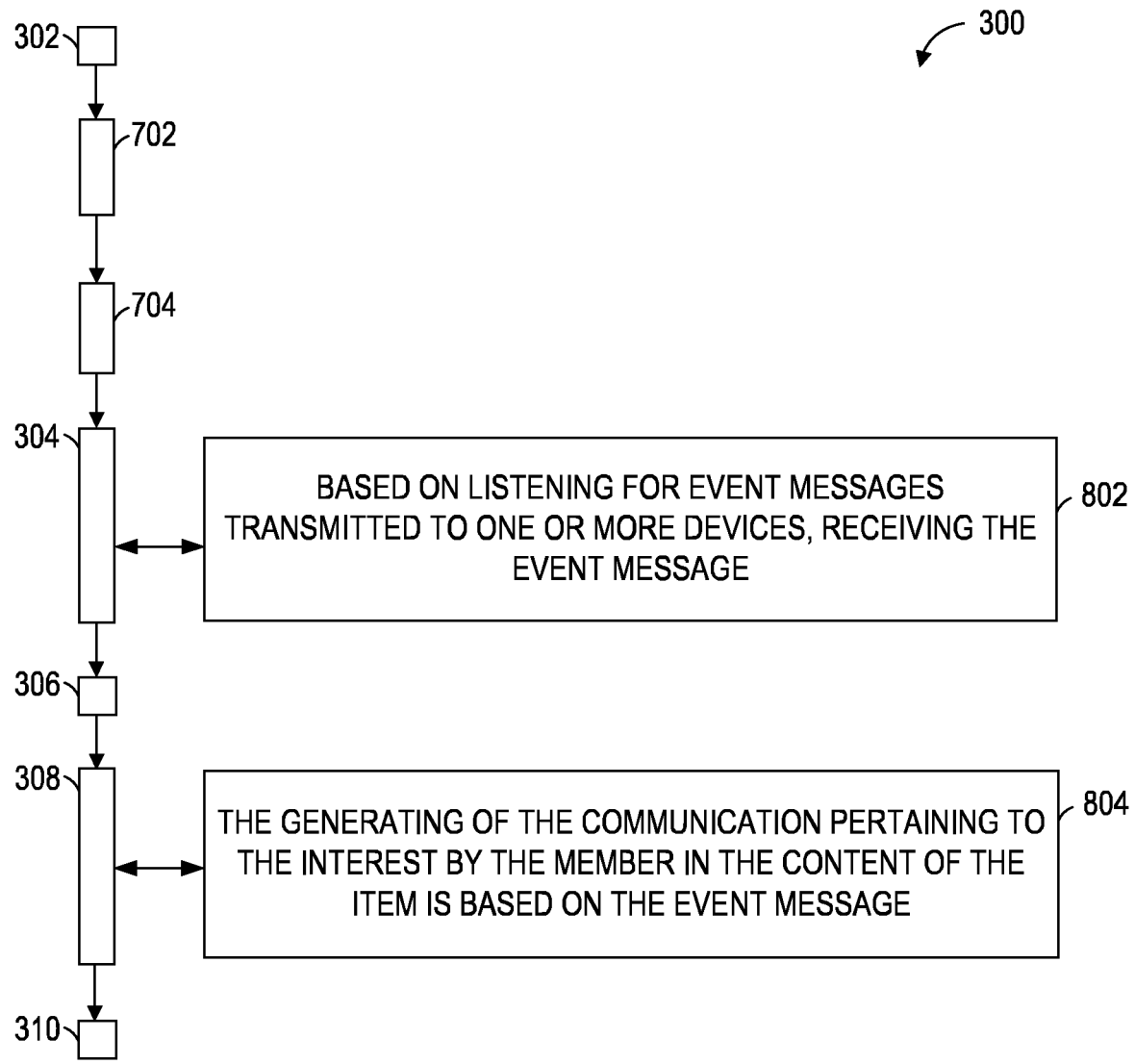
FIG. 8 is a flowchart illustrating a method for generating recruitment leads, and representing steps 304 and 308 of the method illustrated in FIG. 7 in more detail and an additional step of the method illustrated in FIG. 7, according to some example embodiments.

As shown in FIG. 8, method 300 may include one or more of operations 802 and 804, according to some example embodiments. Operation 802 may be performed as part of operation 304 of method 300 illustrated in FIG. 7, in which the access module 204 accesses an event message pertaining to an interaction by the member with the item of digital media. At operation 802, the access module 204 receives the event message. The receiving of the event message may be based on the access module 204 listening for event messages transmitted to (e.g., broadcast) to one or more devices of the lead generating system 200.

Operation 804 may be performed as part of operation 308, in which the communication module 208 generates a communication pertaining to the interest by the member in the content of the item. At operation 804, the communication module 208 generates the communication pertaining to the interest by the member in the content of the item based on the event message.

Figure 9:
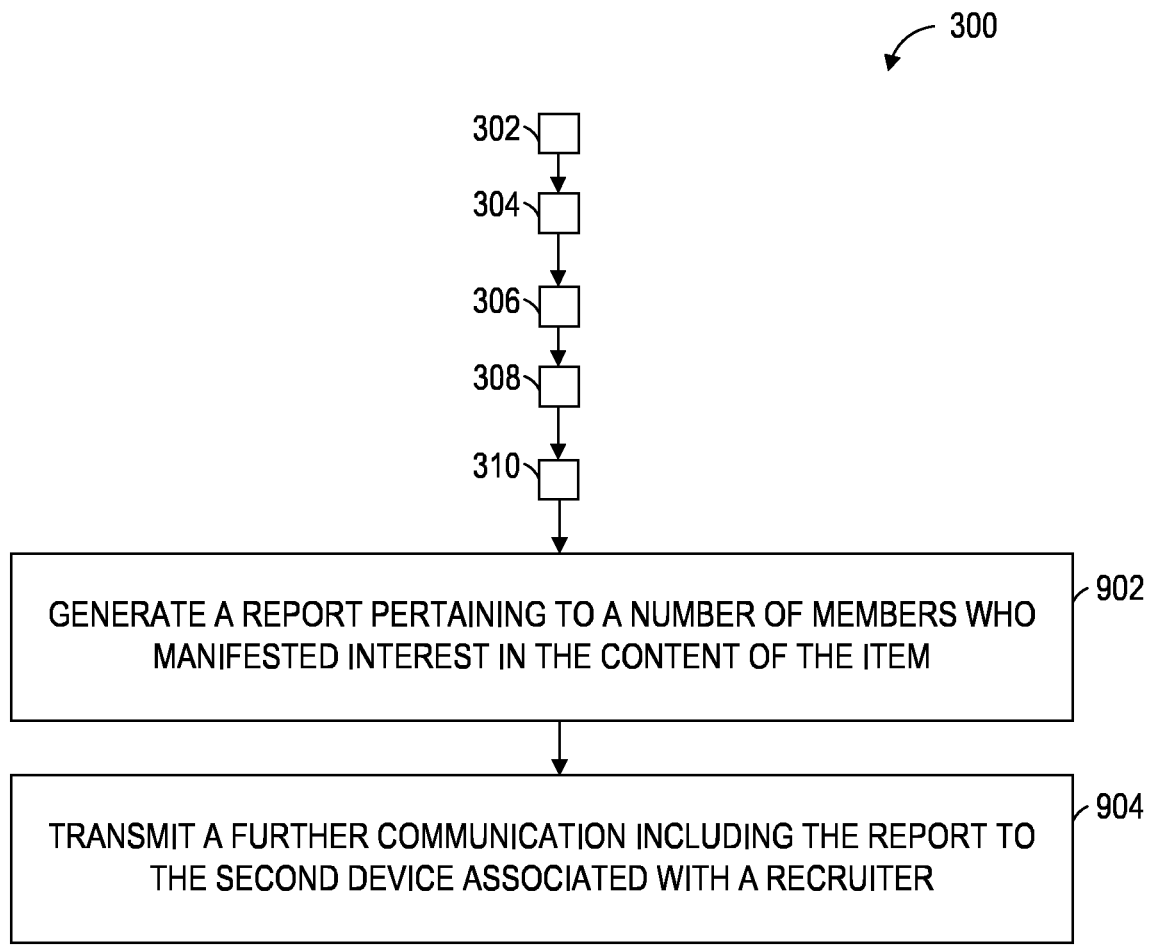
FIG. 9 is a flowchart illustrating a method for generating recruitment leads, and representing additional steps of the method illustrated in FIG. 3, according to some example embodiments.

As shown in FIG. 9, method 300 may include one or more of operations 902 and 904, according to some example embodiments. Operation 902 may be performed after operation 310, in which the communication module 208 transmits the communication to a second device associated with a recruiter. At operation 902, the report generating module 214 generates a report pertaining to a number of members who manifested interest in the content of the item.

Operation 904 may be performed after operation 902. At operation 904, the communication module 208 transmits a further communication including the report to the second device associated with a recruiter.

In some example embodiments, after a company launches a recruiting campaign that includes a landing page, a recruiter may access a web site associated with the recruiting campaign, where the recruiter can see all the recruiting campaigns launched by the company so far, and how many members have responded to a particular recruiting campaign so far (e.g., manifested express interest in the content of the recruiting campaign by clicking a UI element). This can be done by a recruiter system requesting this information from the lead generation system 200. The lead generation system 200 (e.g., the communication module 208) may retrieve this information from a database (e.g., the recruiter database 136, the campaign database 138, or the ad server database 140). The recruiter may then contact individual members who showed interest in the content of landing pages associated with the campaigns to try to hire members for particular jobs described on the landing pages associated with the recruiting campaigns.

Figure 10:
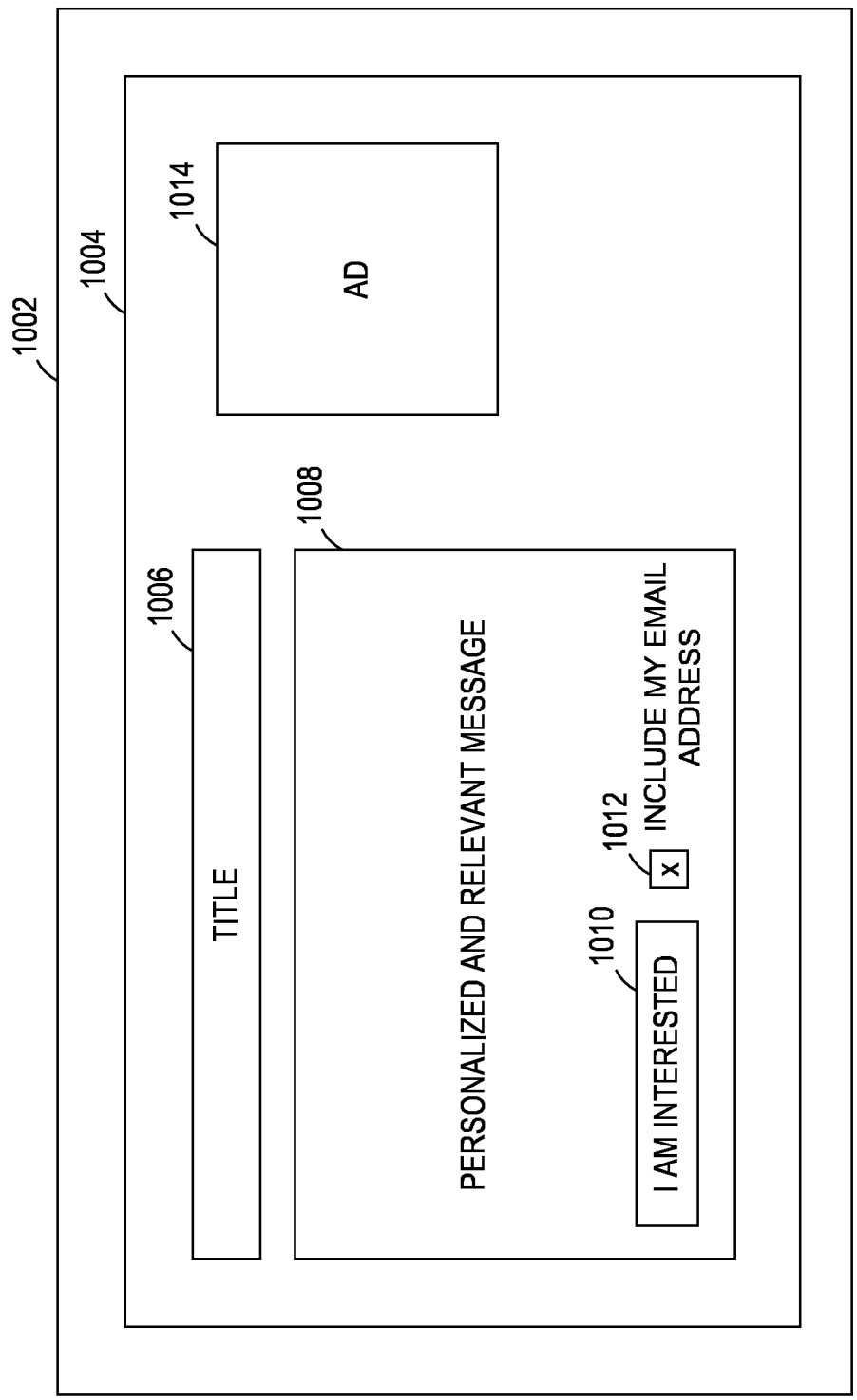
FIG. 10 is a diagram illustrating a user interface displaying a landing page, according to some example embodiments.

FIG. 10 is a diagram illustrating a user interface 1002 displaying a landing page 1004, according to some example embodiments. In some example embodiments, as shown in FIG. 10, user interface 1002 of a device (e.g., the first device) associated with the member displays the landing page 1004. In some instances, the look of the landing page 1004 may be different based on the device (e.g., a laptop, a tablet, or a phone) on which the user interface 1002 is displayed.

The landing page 1004 may include a title 1006 to inform the member about the content of the landing page 1004. The landing page 1004 may also include a message 1008. The message 1008 may be personalized for and relevant to one or more members including the member based on one or more attributes stored member profiles of the one or more members, based on member activity and behavior data associated with the one or more members, or both. The member profile data associated with the one or more members may be stored in and accessed from profile database 128. The member activity and behavior data associated with the one or more members may be stored in and accessed from member activity and behavior database 132.

The landing page 1004 may also include a button 1010. By selecting (e.g., clicking) the button 1010, the member may express the member's interest in the message 1008. The landing page 1004 may also include, in some instances, a check box 1012. By selecting (e.g., clicking) the check box 1012, the member may request that the lead generating system 200 communicates the member's email address to a recruiter (e.g., via a user interface of a device associated with the recruiter, such as the second device.) In some instances, the landing page 1004 includes a further item of digital media, such as an ad 1014. In some example embodiments, the ad 1014 is associated with (e.g., is relevant to, pertains to, is related to, etc.) the message 1008.

Example Mobile Device

Figure 11:
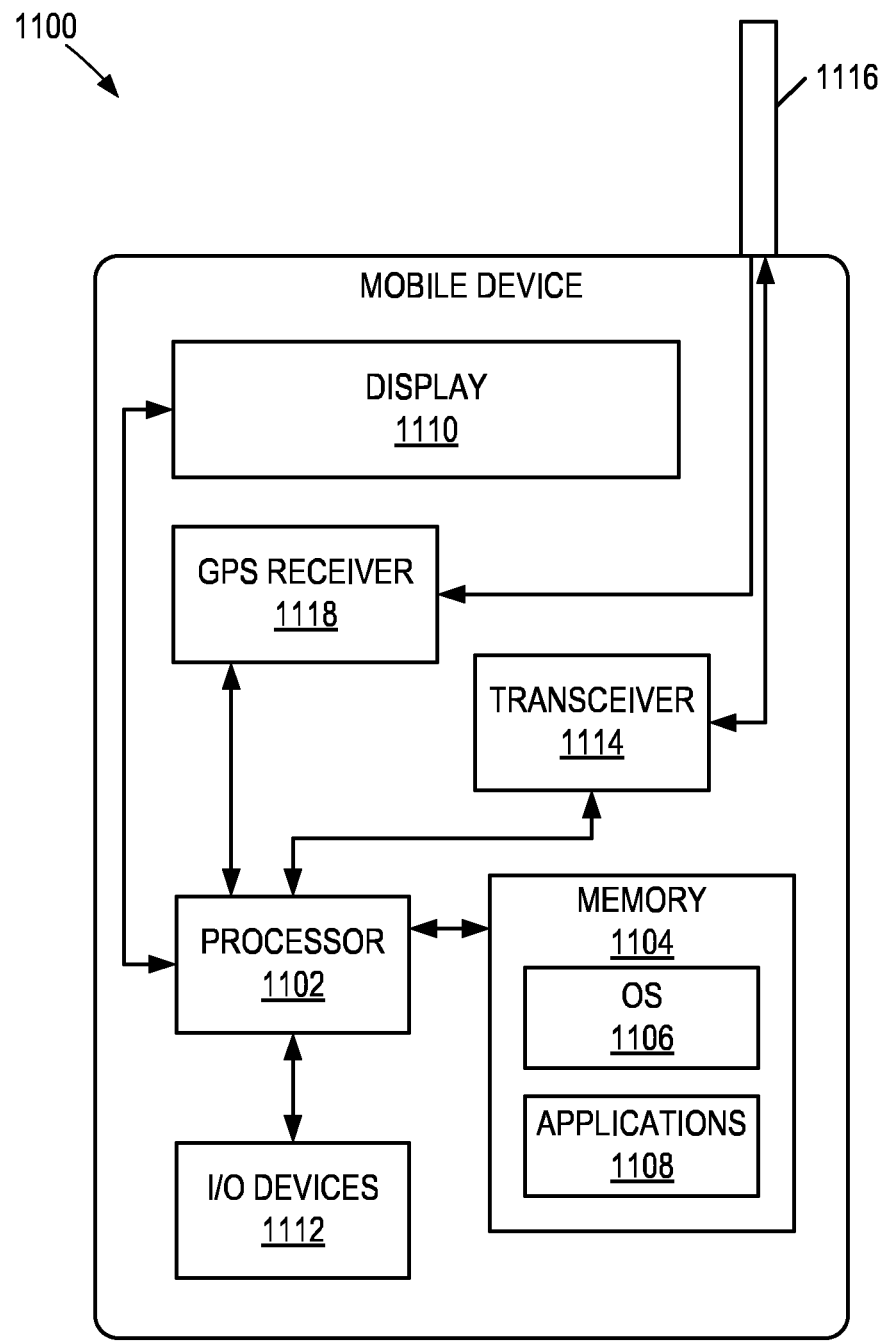
FIG. 11 is a block diagram illustrating a mobile device, according to some example embodiments.

FIG. 11 is a block diagram illustrating a mobile device 1100, according to an example embodiment. The mobile device 1100 may include a processor 1102. The processor 1102 may be any of a variety of different types of commercially available processors 1102 suitable for mobile devices 1100 (for example, an XScale architecture microprocessor, a microprocessor without interlocked pipeline stages (MIPS) architecture processor, or another type of processor 1102). A memory 1104, such as a random access memory (RAM), a flash memory, or other type of memory, is typically accessible to the processor 1102. The memory 1104 may be adapted to store an operating system (OS) 1106, as well as application programs 1108, such as a mobile location enabled application that may provide LBSs to a user. The processor 1102 may be coupled, either directly or via appropriate intermediary hardware, to a display 1110 and to one or more input/output (I/O) devices 1112, such as a keypad, a touch panel sensor, a microphone, and the like. Similarly, in some embodiments, the processor 1102 may be coupled to a transceiver 1114 that interfaces with an antenna 1116. The transceiver 1114 may be configured to both transmit and receive cellular network signals, wireless data signals, or other types of signals via the antenna 1116, depending on the nature of the mobile device 1100. Further, in some configurations, a GPS receiver 1118 may also make use of the antenna 1116 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors or processor-implemented modules, not only residing within a single machine, but deployed across a number of machines. In some example embodiments, the one or more processors or processor-implemented modules may be located in a single location (e.g., within a home environment, an office environment or as a server farm), while in other embodiments the one or more processors or processor-implemented modules may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
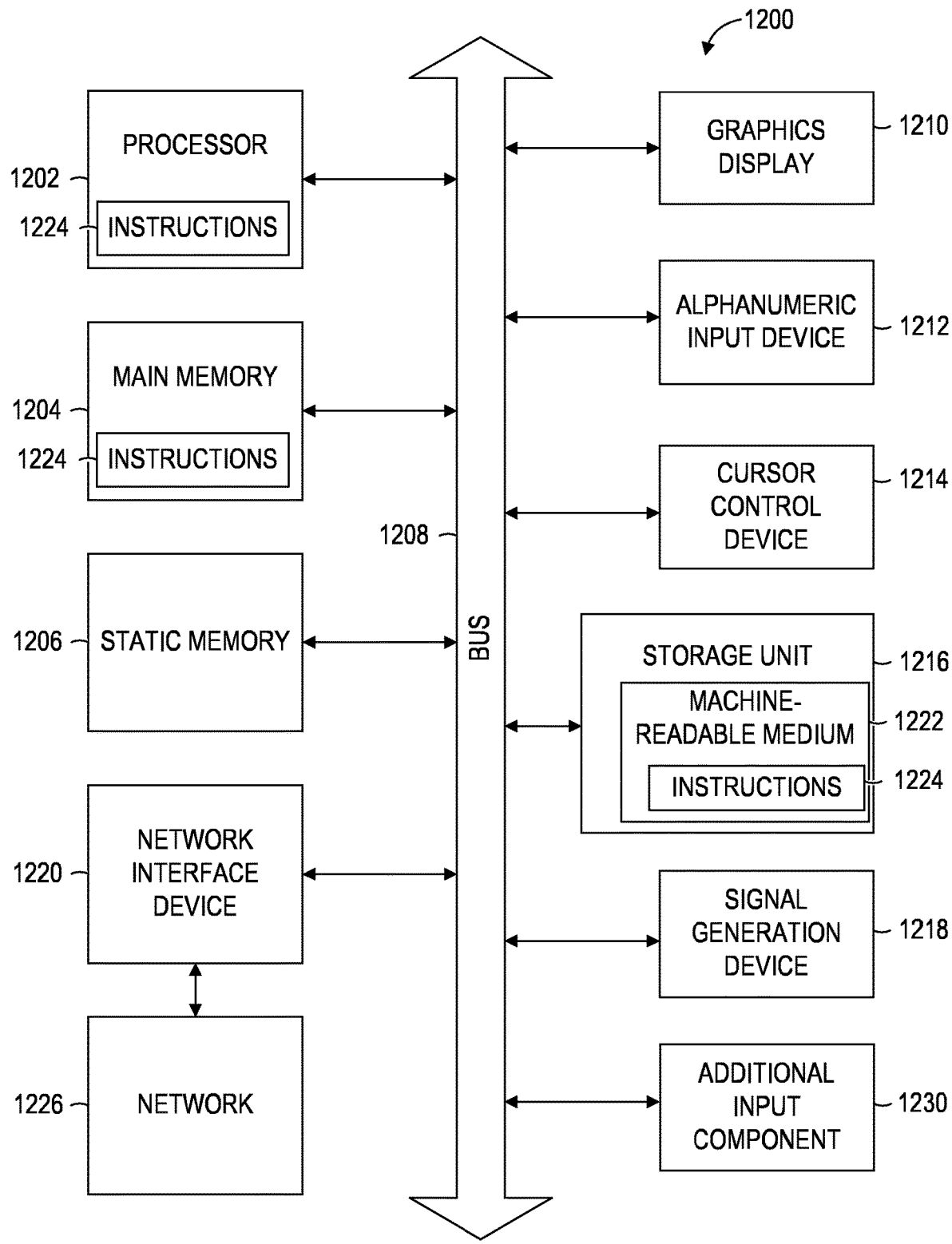
FIG. 12 is a block diagram illustrating components of a machine, according to some example embodiments, able to read instructions from a machine-readable medium and perform any one or more of the methodologies discussed herein.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, a computer-readable storage medium, or any suitable combination thereof) and perform any one or more of the methodologies discussed herein, in whole or in part. Specifically, FIG. 12 shows the machine 1200 in the example form of a computer system (e.g., a computer) within which the instructions 1224 (e.g., software, a program, an application, an applet, an app, or other executable code) for causing the machine 1200 to perform any one or more of the methodologies discussed herein may be executed, in whole or in part.

In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a distributed (e.g., peer-to-peer) network environment. The machine 1200 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include any collection of machines that individually or jointly execute the instructions 1224 to perform all or part of any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, an audio generation device 1218 (e.g., a sound card, an amplifier, a speaker, a headphone jack, or any suitable combination thereof), and a network interface device 1220.

The storage unit 1216 includes the machine-readable medium 1222 (e.g., a tangible and non-transitory machine-readable storage medium) on which are stored the instructions 1224 embodying any one or more of the methodologies or functions described herein. The instructions 1224 may also reside, completely or at least partially, within the main memory 1204, within the processor 1202 (e.g., within the processor's cache memory), or both, before or during execution thereof by the machine 1200. Accordingly, the main memory 1204 and the processor 1202 may be considered machine-readable media (e.g., tangible and non-transitory machine-readable media). The instructions 1224 may be transmitted or received over the network 1226 via the network interface device 1220. For example, the network interface device 1220 may communicate the instructions 1224 using any one or more transfer protocols (e.g., hypertext transfer protocol (HTTP)).

In some example embodiments, the machine 1200 may be a portable computing device, such as a smart phone or tablet computer, and have one or more additional input components 1230 (e.g., sensors or gauges). Examples of such input components 1230 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1224 for execution by the machine 1200, such that the instructions 1224, when executed by one or more processors of the machine 1200 (e.g., processor 1202), cause the machine 1200 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
automatically selecting, from a plurality of members of a social networking service (SNS), at least one member determined to be suitable for a job description associated with a recruiter;
customizing, for the member, a landing page associated with a job campaign, the customized landing page including a message personalized for the member based on one or more attributes contained in a member profile corresponding to the member and based on member data associated with the member, the message further containing a first user interface element and a second user interface element, the first user interface element, when selected, generating a communication regarding the personalized message, the second user interface element, when selected, generating a communication revealing the member's contact information to a recruiter, the customization landing page further including an item of digital media selected for the member;
causing a presentation of the customized landing page including the item of digital media on a first device associated with the member;
receiving, from the first device, an event message indicating selection of the first user interface element by the member;
based on the event message, causing display, on a second device associated with the recruiter, of the communication regarding the personalized message along with a third user interface element which, when selected, causes a communication to be sent to the member.

2. The method of claim 1, wherein the causing of the presentation of the customized landing page including the item of digital media includes causing a presentation of a Uniform Resource Locator (URL) that identifies a web page displaying career-related content.

3. The method of claim 1, wherein the causing of the presentation of the customized landing page including the items of digital media includes:
causing a presentation of a Uniform Resource Locator (URL) associated with a page that includes a description of a job for which the member is a target candidate in the first user interface of the first device, the method further comprising:
receiving an indication of a selection of the URL from the first device;
based on the URL, identifying a campaign identifier associated with a campaign that includes the item of digital media;
based on the campaign identifier, identifying a creative identifier that identifies a file that includes a page content; and
based on the creative identifier, causing a presentation of the page content in the first user interface of the first device.

4. The method of claim 3, wherein the first user interface element is included in the page content for selection by the member.

5. The method of claim 3, wherein the communication caused to display on the second user interface of the second device identifies the member as a lead for the job.

6. The method of claim 1, wherein the item of digital media describes a company, and the first user interface element, when selected, causes communication to the company.

7. The method of claim 1, wherein the item of digital media describe a job, and the first user interface element, when selected, causes communication regarding the job.

8. The method of claim 1, wherein the item of digital media describe a particular type of job, and the first user interface element, when selected, causes communication regarding the particular type of job.

9. The method of claim 1, further comprising:
matching the item of digital media and the member based on the content of the item of digital media and a targeting criterion.

10. The method of claim 1, wherein the member is one of one or more members of the social networking service who are targeted for the presentation of the item of digital media.

11. The method of claim 1, the event message including at least one of an identifier of the item of digital media, a member identifier of the member, and a campaign identifier of a campaign that includes the item of digital media.

12. The method of claim 11, wherein the receiving of the event message is based on listening for one or more event messages transmitted to one or more devices.

13. The method of claim 1, further comprising:
generating a report pertaining to a number of members who selected the first user interface element; and
transmitting a further communication including the report to the second device associated with the recruiter.

14. A system comprising:
one or more hardware processors; and
a machine-readable medium for storing instructions that, when executed by the one or more hardware processors, cause the system to perform operations comprising:
automatically selecting, from a plurality of members of a social networking service (SNS), at least one member determined to be suitable for a job description associated with a recruiter;
customizing, for the member, a landing page associated with a job campaign, the customized landing page including a message personalized for the member based on one or more attributes contained in a member profile corresponding to the member and based on member data associated with the member, the message further containing a first user interface element and a second user interface element, the first user interface element, when selected, generating a communication regarding the personalized message, the second user interface element, when selected, generating a communication revealing the member's contact information to a recruiter, the customization landing page further including an item of digital media selected for the member;
causing a presentation of the customized landing page including the item of digital media on a first device associated with the member;
receiving, from the first device, an event message indicating selection of the first user interface element by the member;
based on the event message, causing display, on a second device associated with the recruiter, of the communication regarding the personalized message along with a third user interface element which, when selected, causes a communication to be sent to the member.

15. The system of claim 14, wherein the causing of the presentation of the customized landing page including the item of digital media includes causing a presentation of a Uniform Resource Locator (URL) that identifies a web page displaying career-related content.

16. The system of claim 14, wherein the causing of the presentation of the customized landing page including the items of digital media includes:
  causing a presentation of a Uniform Resource Locator (URL) associated with a page that includes a description of a job for which the member is a target candidate in the first user interface of the first device, the method further comprising:
  receiving an indication of a selection of the URL from the first device;
  based on the URL, identifying a campaign identifier associated with a campaign that includes the item of digital media;
  based on the campaign identifier, identifying a creative identifier that identifies a file that includes a page content; and
  based on the creative identifier, causing a presentation of the page content in the first user interface of the first device.

17. The system of claim 14, wherein the operations further comprise:
  matching the item of digital media and the member based on a content of the item of digital media and a targeting criterion.

18. The system of claim 14, the event message including at least one of an identifier of the item of digital media, a member identifier of the member, and a campaign identifier of a campaign that includes the item of digital media.

19. The system of claim 18, wherein the receiving of the event message is based on listening for one or more event messages transmitted to one or more devices.

20. A non-transitory machine-readable storage medium comprising instructions that, when executed by one or more hardware processors of a machine, cause the machine to perform operations comprising:
  automatically selecting, from a plurality of members of a social networking service (SNS), at least one member determined to be suitable for a job description associated with a recruiter;
  customizing, for the member, a landing page associated with a job campaign, the customized landing page including a message personalized for the member based on one or more attributes contained in a member profile corresponding to the member and based on member data associated with the member, the message further containing a first user interface element and a second user interface element, the first user interface element, when selected, generating a communication regarding the personalized message, the second user interface element, when selected, generating a communication revealing the member's contact information to a recruiter, the customization landing page further including an item of digital media selected for the member;
  causing a presentation of the customized landing page including the item of digital media on a first device associated with the member;
  receiving, from the first device, an event message indicating selection of the first user interface element by the member;
  based on the event message, causing display, on a second device associated with the recruiter, of the communication regarding the personalized message along with a third user interface element which, when selected, causes a communication to be sent to the member.

* * * * *